Sept. 13, 1960 M. B. MacKAY 2,952,410

WATER HEATING SYSTEM

Filed Aug. 14, 1957 2 Sheets-Sheet 1

INVENTOR.
MALCOLM B. MACKAY
BY
Andrus, Sceales & Starke
Attorneys

Sept. 13, 1960    M. B. MacKAY    2,952,410
WATER HEATING SYSTEM
Filed Aug. 14, 1957    2 Sheets-Sheet 2
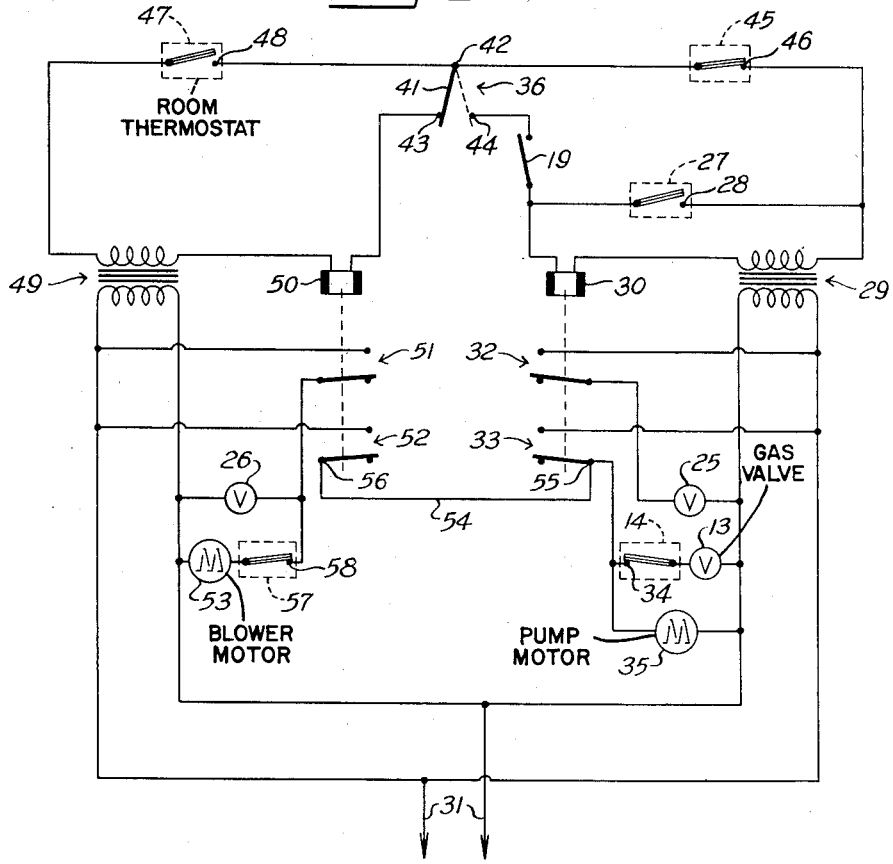
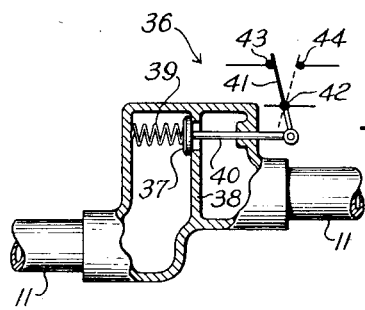
INVENTOR.
MALCOLM B. MACKAY
BY
Attorneys United States Patent Office 2,952,410
Patented Sept. 13, 1960

2,952,410

WATER HEATING SYSTEM

Malcolm B. MacKay, Toledo, Ohio, assignor to A. O. Smith Corporation, Milwaukee, Wis., a corporation of New York Filed Aug. 14, 1957, Ser. No. 678,139

8 Claims. (Cl. 237—8)

This invention relates to a water heating system and more particularly to a system which can be utilized to supply water at two different temperatures for three separate purposes.

Commercial water heating systems, such as those covered by United States Patent Nos. 2,591,400 and 2,291,023 assigned to a common assignee with the present application, are directed to water heating systems in which a single heater is used in combination with a storage tank and a pump to supply water at two temperatures. In these systems, approximately 140° F. water is supplied from the tank for normal usage and a higher temperature water, at approximately 180° F., is supplied for sanitizing or rinsing operations.

In these prior systems, water is maintained in a storage tank at approximately 140° F. by passing the water from the tank through a heater and returning the heated water to the tank through a high temperature heated water line. Water discharged from the heater through the high temperature water line is at sanitizing temperatures and this sanitizing water is drawn from the hot water line through a discharge line of minimum length to the apparatus of use, which may be a dishwashing machine or the like. Under this system, there is no storage required for the 180° F. sanitizing water, yet the 180° F. water is readily available for rinsing or sanitizing operations.

The present invention goes beyond the water systems described in the above patents, and is adapted to supply 180° F. water not only for sanitizing purposes but also for space heating requirements as well. According to the invention, a by-pass line is connected from the hot water line to a heat exchanging device disposed at the location where the space heating is to be supplied, and a return conduit connects the heat exchanger with the low temperature heated water line connecting the hot water tank and the heater. With this arrangement, water at 180° F. being discharged from the heater, may pass through either the high temperature water line and return to the storage tank or it may pass through the by-pass conduit to the heat exchanger and return to the conduit connecting the water tank and the heater.

The present system provides a recovery cycle in which the heater is actuated and high temperature heated water is circulated to the storage tank when the water temperature in the tank falls below 140° F. so that water is maintained at this temperature for general purpose use. In addition, when water is drawn at the sanitizing apparatus for rinsing operations, the system provides a booster cycle in which the heater is actuated and water is circulated through the high temperature line so that 180° F. will be constantly available at the sanitizing apparatus.

As a third cycle, if the room thermostat associated with the space heating or other heat exchanging device calls for heat, high temperature water is supplied to the heat exchanger.

Thus, a temperature of about 140° F. is maintained in the hot water storage tank for general purpose use, while at the same time high temperature water at a temperature of about 180° F. can be supplied to the heat exchanger for space heat requirements if the room thermostat is calling for heat. However, the system will prevent the flow of hot water to the storage tank if the tank aquastat is not calling for heat, even though 180° F. water is being supplied to the heat exchanger for space heating requirements.

The present hot water system also prevents a possible drop in temperature of the 180° F. water being supplied for the sanitizing operation by interrupting the flow of 180° F. water to the space heater during the flow of 180° F. water through the discharge line to the sanitizing device. Even if the room thermostat associated with the space heater is simultaneously calling for heat, 180° F. water will be supplied only for the sanitizing operation so that the full capacity of the water heater is available for maintaining the required flow rate and temperature of the sanitizing water during each rinsing period of the sanitizing device.

The present water system also conducts any excess of 180° F. water above the rate of flow required by the sanitizing operation back to the hot water storage tank to partially replace the 140° F. water drawn from the tank during the booster cycle of operation of the water heater.

Furthermore, a safety feature is incorporated in the system by preventing the temperature of the water in the hot water storage tank from rising above 160° F. during periods when the sanitizing operation is in effect.

Other objects and advantages of the invention will appear in the course of the following description.

In the drawings:

Fig. 2 is a wiring diagram for the system shown in Figure 1; and

Fig. 3 is a vertical section of the flow switch.

Figure 1:
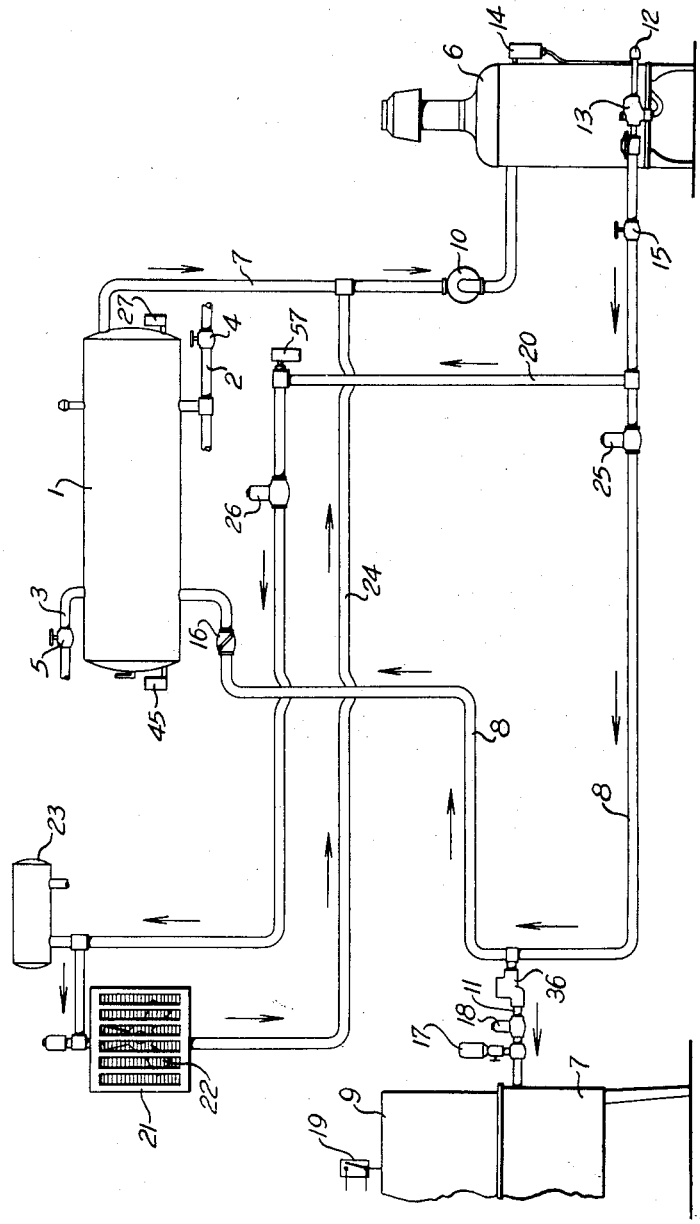
Figure 1 is a schematic representation of the water heating system of the present invention.

The drawings illustrate a water heating system adapted to supply water at two different temperatures. One supply of water at about 140° F. is used for general washing operations and a higher temperature water, at about 180° F., is adapted to be used for sanitizing purposes and also for space heating requirements.

The water heating system comprises a hot water storage tank 1 which is adapted to contain water at about 140° F. Cold water is supplied to the storage tank 1 through a conduit 2 and low temperature heated water at a temperature of about 140° F. is drawn from the hot water tank through a conduit 3. The conduits 2 and 3 may be closed or opened as desired by means of valves 4 and 5, respectively. The water discharged from conduit 3 is for general purpose use in sinks, lavatories, etc.

Low temperature heated water is conducted from the tank 1 to a gas fired water heater 6 by means of a conduit 7. The water is heated in the heater 6 and is circulated from the heater through a high temperature conduit 8 to a position adjacent the apparatus 9 which is to use the sanitizing water, and is then returned to the storage tank 1 to provide a closed circulating system. The water is circulated through the closed system by a pump 10 which is located in the conduit 7, as shown in the drawings, or alternately in the conduit 8.

A discharge line 11 of minimum length connects the hot water conduit 8 with the apparatus 9, such as a dishwashing machine, which is to intermittently utilize the sanitizing water.

The hot water heater 6 is of a conventional type in which the water is passed through a coiled conduit and heated by a gas burner. Gas is supplied to the burner through a gas line 12 and the flow of gas within line 12 is controlled by a solenoid operated gas valve 13. A water temperature control thermostat 14 is disposed in the coiled conduit and is responsive to the water temperature therein. The thermostat 14 serves to modulate the flow of gas through the burner in response to the demand for heat or to turn the flow of gas on or off in response to the demand for heat, depending on the type of heater used. High temperature heated water at a sanitizing temperature of about 180° F. is discharged from the heater into the high temperature water conduit 8.

The high temperature conduit 8 extends from the heater 6 to a location adjacent the dishwashing machine or other sanitizing device and then to the tank 1. By extending conduit 8 from the heater to the dishwashing machine regardless of the relative distance between the heater and dishwashing machine, the length of the discharge line 11 is minimized so that there will be a limited length of piping within which the sanitizing water can cool beneath the sanitizing temperature during idle periods. With the present water heating system, sanitizing water is circulated to adjacent the dishwashing machine and thus when water is drawn for rinsing purposes, there will be a minimum quantity of cool water initially drawn to the dishwashing machine. This construction makes it possible to draw hot water at a sanitizing temperature at all times regardless of the length of the period of non-operation. The present installation includes a definite provision for preventing the water in pipe lines between the heaters of the dishwashing machine from cooling below 180° F. and this provision is essential in order to maintain proper sanitation standards.

To permit draining of the conduit 8, a suitable drain faucet 15 is located in the conduit adjacent the heater 6.

Water is prevented from flowing from storage tank 1 through conduit 8 to the dishwashing machine 9 by means of a check valve 16 which is located in conduit 8 between discharge line 11 and tank 1. Check valve 16 permits the flow of water from heater 6 to tank 1 when sanitizing water is not being drawn at the dishwashing machine and prevents the flow of the lower temperature water from tank 1 through conduit 8 to the dishwashing machine when sanitizing water is being drawn.

Discharge line 11 which connects the high temperature conduit 8 and dishwashing machine 9 is provided with a conventional water hammer arrester 17 and pressure reducing valve 18.

The operation of the dishwashing machine 9 is controlled by a manually operated toggle switch 19 which, when closed, will put the dishwashing machine into operation and begin the dishwashing cycle. The sanitizing water is only supplied to the dishwashing machine during the rinsing or sanitizing cycles of the dishwashing procedure and thus, sanitizing water is not immediately drawn to the dishwashing machine on closing of toggle switch 19, but is drawn only during the intermittent rinsing cycles.

To also utilize the high temperature heated water for space heating requirements, as in the case of a drive-in restaurant or the like which has no central heating, a by-pass conduit 20 communicates with high temperature conduit 8 and is connected to a heat exchanger 21 or other space heating device. As shown in Figure 1, the heat exchanger is a standard unit heater located in the room or other space to be heated and has a blower or fan 22 which directs a stream of air over the heat transfer surface to heat the air. A suitable expansion tank 23 is connected to the by-pass conduit 20 ahead of the heat exchanger 21.

Water is returned from the heat exchanger to the low temperature water conduit 7 by return conduit 24. With this arrangement, the heater 6, high temperature conduit 8, by-pass conduit 20, heat exchanger 21, return conduit 24 and low temperature conduit 7 constitutes a closed system for the circulation of high temperature water to the heat exchanger. The connection of return conduit 24 to conduit 7 is located so that pump 10 is in the closed circuit so that the pump can be employed to circulate water through this closed circuit as well as the closed circuit consisting of tank 1, conduit 7, heater 6 and conduit 8.

The flow of water through the conduits 8 and 20 is controlled by solenoid valves 25 and 26, respectively. Valve 25 is located in conduit 8 between the connections of conduits 20 and 11, and when open permits the flow of high temperature water to tank 1 or to the dishwasher 9. Valve 26 controls the flow of high temperature water to the heat exchanger 21.

To maintain the temperature of the water in tank 1 at about 140° F., a temperature responsive device or aquastat 27 is disposed in the wall of the tank and is responsive to the water temperature therein. When the temperature of the water in tank 1 falls beneath 140° F., the aquastat 27 serves to start the pump 10 and heater 6 and open valve 25 and thereby circulate high temperature water to the tank. As shown in Fig. 2, the normally open contacts 28 of aquastat 27 are connected across the output of a transformer 29 in series with a relay 30. The input of transformer 29 is connected to power lines 31.

Closing of aquastat contacts 28 due to the temperature in tank 1 falling below 140° F. energizes relay 30 to close switches 32 and 33. Switch 32 is connected across the input of transformer 29 in series with solenoid valve 25, while switch 33 is also connected across the input of the transformer 29 in series with the normally closed contacts 34 of water control thermostat 14 and gas valve 13. The motor 35 of pump 10 is connected in parallel across the thermostat 14 and gas valve 13.

The closing of switches 32 and 33 opens valve 25 to permit high temperature water to flow in conduit 8 to tank 1 and at the same time opens gas valve 13 to heat the water and actuates pump motor 35 to circulate water within conduit 8 to tank 1.

When the recovery cycle is complete and the temperature of the water in tank 1 reaches 140° F., the contacts 28 of aquastat 27 open thereby de-energizing relay 30 and opening switches 32 and 33. The opening of switches 32 and 33 opens valve 25, closes gas valve 13 and stops the pump motor 35.

To supply high temperature water to the dishwashing machine for rinsing cycles, a flow switch 36 is disposed in discharge conduit 11. The flow switch 36 may comprise any suitable single pole-double throw switch, such as that shown in Patent No. 2,591,400, which is operated in response to movement or drawing of water through line 11. As shown in Fig. 3, a valve disc 37 is biased into engagement with a valve seat formed in the internal wall 38 of the flow switch by a spring 39. The valve stem 40 extends outwardly of the flow switch casing and is connected to one end of a common connector leaf 41 which is fulcrumed at 42. The leaf 41 is normally biased into engagement with contact 43 when no water is flowing through flow switch 36 and valve 37 is closed. Flow of water through the flow switch opens the valve 37 against the spring tension and moves leaf 41 into engagement with contact 44.

The contact 44 is connected, as shown in Fig. 2, across the output of transformer 29 and in series with toggle switch 19, which is manually closed at the start of the dishwashing operation, and relay 30. Thus, when water is drawn to the dishwashing machine 9, the flow of water through flow switch 33 moves leaf 41 of switch 36 into engagement with contact 44 to thereby energize relay 30. Energization of relay 30, as previously described, opens valve 25, opens gas valve 13 to operate heater 6 and starts operation of pump motor 35.

When the rinsing cycle is completed and the flow of high temperature water to the dishwashing machine is shut off, the leaf 41 will be spring biased out of engagement with contact 44 to open the circuit and de-energize relay 30. The de-energization of relay 30 closes valve 25, closes gas valve 13 to shut off the heater and stops the pump motor 35 so that water is neither heated nor circulated through conduit 8.

With this system, when water is drawn at the dishwashing machine through line 11 for rinsing purposes, the flow switch 36 is actuated to start the pump motor 35 and open valves 25 and 13 to circulate high temperature water through the conduit 8. Any excess high temperature water, over and above that flowing through line 11 to the dishwashing machine will be returned to the tank 1 to partially replace the 140° F. water drawn from the tank during this cycle.

When the flow of rinse or sanitizing water through line 11 to the dishwashing machine is stopped, the valves 25 and 13 will close and the pump motor 35 will stop so that no high temperature water will be circulated through conduit 8 unless the aquastat 27 in tank 1 is calling for heat.

To prevent the water in tank 1 from being overheated, a second aquastat 45 is located in the tank and the normally closed contacts 46 of aquastat 45 are connected in series with the pivot 42 of flow switch 36 and the output of the transformer 29. The normally closed contacts 46 will open if the temperature of the water in tank 1 is raised to a temperature of about 160° F. to de-energize relay 30 and thereby close valve 25, close gas valve 13 and stop operation of the pump motor 35. The aquastat 45 serves to prevent the temperature of the water in tank 1 from rising above 160° F. or other control setting during periods when the dishwashing machine is in operation.

While the system has been described as having two separate aquastats 27 and 45 to be used in tank 1, it is contemplated that a single dual immersion type of aquastat could be employed.

The temperature of the room of other space to be heated by heat exchanger 21 is controlled by a thermostat 47. The normally open contacts 48 of thermostat 47 are connected across the output of a step-down transformer 49 and in series with relay 50 and contact 43 of flow switch 36.

When the room temperature falls beneath the control setting, contacts 48 are closed. The closing of contacts 48—assuming there is no water flow through discharge line 11 to the dishwashing machine so that leaf 41 is in engagement with contact 43—energizes the relay 50 to close switches 51 and 52. Switch 51 is connected across the input of transformer 49 in series with solenoid valve 26, and the motor 53 of blower 22 is connected in parallel across valve 26. The switch 52 is connected in a jumper line 54 which connects the contact 55 of switch 33 with contact 56 of switch 52.

The closing of switch 51 by energizing relay 50 opens valve 26 in conduit 20 and also starts the blower motor 53, while the simultaneous closing of switch 52 by energizing of relay 50 opens gas valve 13 and starts the motor 35 of pump 10 to heat the water and circulate the high temperature heated water through conduit 20 to the heat exchanger. Air being blown across the heat exchanger by the blower 22 is heated and serves to raise the temperature in the room. When the room temperature is raised to the setting of thermostat 47, the contacts 48 are opened and relay 50 de-energized. De-energizing relay 50 closes valve 26 to prevent the flow of water in conduit 20 and stops the blower motor 53. In addition, the gas valve 13 is closed and the pump operation is stopped by the de-energization of relay 50.

By connecting the flow switch 36 in the space heating circuit, the flow of high temperature water to the heat exchanger 21 is interrupted during the periods of drawing high temperature water to the dishwashing machine. This feature insures that the full capacity of the water heater is available for maintaining the required flow rate and 180° F. temperature of sanitizing water to the dishwashing machine during each rinse period. With this system, the leaf 41 of flow switch 36 is moved out of engagement with contact 43 whenever water is drawn through line 11 and the circuit through relay 50 is thereby opened to prevent flow of high temperature water through conduit 20 to heat exchanger 21 during periods of drawing water through line 11.

As the flow of 180° F. water to the heat exchanger 21 or other space heating unit will be interrupted only during each rinsing period of the dishwashing machine, which is about 10 seconds in duration, this short interruption of water flow to the space heating unit will not adversely affect the stability of the room temperature.

If both the tank aquastat 27 and room thermostat 47 are calling for heat, high temperature heated water will be circulated simultaneously through conduit 8 to tank 1 and also through conduit 20 to heat exchanger 21. If, however, the room thermostat 47 is calling for heat and the tank aquastat 27 is not calling for heat, high temperature water will be circulated only through conduit 20 to the heat exchanger for space heating requirements. In this situation, there will be no flow of water to the tank 1 due to the fact that the return conduit 24 from heat exchanger 21 is connected directly to conduit 3 and does communicate with the tank. This prevents a rise in temperature of the stored water in tank 1 above 140° F. during periods of space heating and when the aquastat 27 is not calling for heat.

To prevent the blower motor 53 from operating if the water temperature in conduit 20 is below 160° F., a temperature responsive device, such as an aquastat 57, is disposed in the conduit 20. The normally closed contacts 58 of aquastat 57 are connected in series with the blower motor 53, as shown in Fig. 2, and if the temperature in conduit 20 falls below 160° F., the aquastat contacts 58 open to open the circuit to the blower. However, the aquastat 57 does not control the operation of solenoid valve 26 nor the gas valve 13 or pump motor 35 so that water will continue to flow through the heat exchanger 21 regardless of the water temperature as long as the room thermostat 47 calls for heat.

It is contemplated that an independent manual control, not shown, may be provided for the blower motor 53 so that the blower may be operated for ventilating purposes when the room thermostat 47 is not calling for heat.

The present system maintains a circulating accelerated flow of sanitizing water to a location adjacent the dishwashing machine by means of the circulating loop conduit 8 during periods when either aquastat 27 in tank 1 is calling for heat or the flow switch 36, or both are calling for heat. At the same time, the system has provision for preventing the temperature of the water in tank 1 from rising above 160° F. during periods when the dishwashing machine is in operation.

The system supplies 180° F. water to the space heating unit when the room thermostat 47 calls for heat, and can simultaneously supply 180° F. to the tank 1 when the aquastat 27 calls for heat. There is also a provision in the system for preventing flow of 180° F. water to the tank 1 when aquastat 27 is not calling for heat even though the room thermostat is calling for heat. In addition, the system suspends or interrupts the flow of 180° F. to the space heating unit during periods when 180° F. is drawn to the dishwashing machine so that the full capacity of the heater is available for maintaining the required temperature of the water to the dishwashing machine.

Various modes of carrying out the invention are contemplated as being within the scope of the following claims particularly pointing out and distinctly claiming the subject matter which is regarded as the invention.

I claim:

1. A water heating device for supplying both a relatively high temperature heated water and a relatively low temperature heated water, comprising a water storage tank to store heated water at said low temperature, a water heater, conduit means connecting said tank and said heater for supplying low temperature heated water to the heater, second conduit means connecting the heater and the tank for returning high temperature heated water to said tank, said tank, heater, first conduit means and second conduit means constituting a closed system for the circulation of water, means for introducing cold water to said system, means for withdrawing low temperature heated water from said system, an apparatus adapted to intermittently utilize the high temperature heated water, discharge conduit means connecting said second conduit means and said apparatus for supplying high temperature heated water to said apparatus, a heat exchanger disposed in heat exchanging relation with a fluid to heat the same, third conduit means connecting the heater with the heat exchanger for supplying high temperature heated water to said heat exchanger, fourth conduit means connecting said heat exchanger with said heater for returning water from the heat exchanger to said heater, said heat exchanger, heater, third conduit means and fourth conduit means constituting a second closed system for the circulation of water, pumping means for circulating water through each of said systems, valve means connected in said first system for regulating the flow of water therein, second valve means connected in said second system for regulating the flow of water therein, thermostatic means responsive to the temperature of the water in said tank for operating said heater and pumping means and opening said first valve means to thereby circulate high temperature heated water through said first system when the temperature of the water in said tank falls below said low temperature, means responsive to the operation of said apparatus for actuating said pumping means and said heater and for opening said first valve means to thereby circulate water through said first system and supply high temperature heated water to said apparatus, and second thermostatic means responsive to the temperature of said fluid for operating said pumping means and said heater and opening said second valve means to thereby circulate water in said second system when the temperature of the fluid falls beneath a predetermined value.

2. A water heating system adapted to deliver heated water at both a high temperature and at a relatively low temperature, which comprises a hot water storage tank adapted to contain heated water at a low temperature, a water heater, a conduit providing communication between the tank and the heater, a second conduit extending from the heater to the storage tank, said tank, heater, first conduit and second conduit constituting a closed system for the circulation of water, means for introducing cold water into said closed system, means for withdrawing low temperature heated water from said closed system, an apparatus to utilize said high temperature heated water and disposed at a remote location with respect to said tank and said heater, a discharge conduit providing communication between said second conduit and the apparatus for supplying high temperature heated water to the apparatus, valve means disposed in the second conduit between the heater and said discharge conduit, a third conduit connecting said second conduit at a location between said heater and said valve means with said first named conduit, space heating means connected in said third conduit and located in a space to be heated, second valve means connected in said third conduit to control the flow of high temperature heated water therein, pump means for circulating the water in said closed system and in said third conduit, means responsive to the temperature of the water in the tank for actuating said pump and heater and for opening said first valve, means to circulate high temperature heated water through said second conduit to said tank when the temperature of the water in the tank falls below said low temperature, flow means responsive to the flow of water through said discharge conduit to said apparatus for actuating said pump and heater and for opening said first valve means to circulate high temperature heated water through said second conduit to said discharge conduit and to said apparatus, and means responsive to the temperature of the space to be heated for actuating said pump and heater and for opening said second valve means to circulate high temperature heated water through said third conduit to said space heating means when the temperature in said space falls below a predetermined setting.

3. A water heating system adapted to deliver heated water at two different temperatures which comprises a hot water storage tank adapted to contain heated water at a relatively low temperature, means to introduce cold water to said tank, means to withdraw low temperature heated water from said tank, a water heater, a conduit providing communication between the tank and the heater, an apparatus to utilize high temperature heated water and disposed at a remote location with respect to said tank and said heater, a second conduit extending from the heater to a position adjacent said apparatus and then to the storage tank, a discharge conduit providing communication between said second conduit and the apparatus for supplying high temperature heated water to the apparatus, valve means disposed in the second conduit between the heater and said discharge conduit, a third conduit connecting said second conduit at a location between said heater and said valve means with said first named conduit, heat exchange means connected in said third conduit and located in a space to be heated, blower means associated with said heat exchange means for directing a stream of air across said heat exchange means to heat said space, second valve means connected in said third conduit to control the flow of high temperature heated water therein, pump means for circulating the water in said system, means responsive to the temperature of the water in the tank for actuating said pump and heater and for opening said first valve means to circulate high temperature heated water through said second conduit to said tank when the temperature of the water in the tank falls below said low temperature, flow means responsive to the flow of water through said discharge conduit to said apparatus for actuating said pump and heater and for opening said first valve means to circulate heated water through said second conduit to said discharge conduit and to said apparatus, means responsive to the temperature of the space to be heated for actuating said pump and heater and blower means and for opening said second valve means to circulate water through said third conduit to said heat exchanging means when the temperature in said space falls below a predetermined setting, and means responsive to the actuation of said flow means for preventing actuation of said last named means to thereby prevent the flow of high temperature heated water to said heat exchanging device during periods of flow of said high temperature heated water to said apparatus.

4. A water heating system adapted to deliver heated water at two different temperatures which comprise a hot water storage tank adapted to contain heated water at a relatively low temperature, means to introduce cold water to said tank, means to withdraw low temperature heated water from said tank, a water heater, a conduit providing communication between the tank and the heater, an apparatus to utilize high temperature heated water and disposed at a remote location with respect to said tank and said heater, a second conduit extending from the heater to a position adjacent said apparatus and then to the storage tank, a discharge conduit providing communication between said second conduit and the apparatus for supplying high temperature heated water to the apparatus, valve means disposed in the second conduit between the heater and said discharge conduit, a heat exchanging device located in a space to be heated, a by-pass conduit connected to said second conduit at a location between said heater and said valve means and communicating with said heat exchanging device, a return conduit connecting said heat exchanging device and said first named conduit, second valve means disposed in said by-pass conduit to control the flow of water therein, pump means for circulating the water in said system, means responsive to the temperature of the water in the tank for actuating said pump and heater and for opening said first valve means to circulate high temperature heated water through said second conduit to said tank when the temperature of the water in the tank falls below said low temperature, flow means responsive to the flow of water through said discharge conduit to said apparatus for actuating said pump and heater and for opening said first valve means to circulate high temperature heated water through said second conduit to said discharge conduit and to said apparatus, means responsive to the temperature of the space to be heated for actuating said pump and heater and for opening said second valve means to circulate water through said by-pass conduit to said heat exchanging device, and means responsive to the actuation of said flow means for preventing actuation of said last named means to thereby prevent the flow of high temperature heated water to said heat exchanging device during periods when high temperature heated water is being drawn to said apparatus.

5. A water heating device for supplying both a relatively high temperature heated water and a relatively low temperature heated water, comprising a water storage tank to store heated water at said low temperature, a water heater, conduit means connecting said tank and said heater for supplying low temperature heated water to the heater, second conduit means connecting the heater and the tank for returning high temperature heated water to said tank, said tank, heater, first conduit means and second conduit means constituting a closed system for the circulation of water, means for introducing cold water to said system, means for withdrawing low temperature heated water from said system, an apparatus adapted to intermittently utilize the high temperature heated water, discharge conduit means connecting said second conduit means and said apparatus for supplying high temperature heated water to said apparatus and having a length substantially less than the length of said second conduit means, third conduit means connecting said heater and said first conduit means, space heating means located in a space to be heated and connected in said third conduit means, valve means disposed in said second conduit means for controlling the flow of high temperature heated water therein, second valve means disposed in said third conduit means for controlling the flow of high temperature water therein, pumping means disposed in said first conduit between said heater and the connection with said third conduit means for circulating water in said closed system and in said third conduit means, thermostatic means responsive to the temperature of the water in said tank for operating said heater and pumping means and opening said first valve means to thereby circulate high temperature heated water through said second conduit means to the tank when the temperature of the water in said tank falls below said low temperature, means responsive to the operation of said apparatus for actuating said pumping means and said heater and for opening said first valve means to thereby circulate water through said first system and supply high temperature heated water to said apparatus, second thermostatic means responsive to the temperature of the space to be heated for operating said pumping means and said heater and for opening said second valve means to circulate high temperature heated water in said third conduit means when the temperature in said space falls beneath a set value, and means for closing said second valve means and preventing flow of high temperature heated water in said third conduit means during periods when high temperature heated water is being drawn through said discharge conduit to said apparatus.

6. A water heated device for supplying both a relatively high temperature heated water and a relatively low temperature heated water, comprising a water storage tank to store heated water at said low temperature, a water heater, conduit means connecting said tank and said heater for supplying low temperature heated water to the heater, second conduit means connecting the heater and the tank for returning high temperature heated water to said tank, said tank, heater, first conduit means and second conduit means constituting a closed system for the circulation of water, means for introducing cold water to said system, means for withdrawing low temperature heated water from said system, an apparatus adapted to intermittently utilize the high temperature heated water, discharge conduit means connecting said second conduit means and said apparatus for supplying high temperature heated water to said apparatus and having a length substantially less than the length of said second conduit means, third conduit means connecting said heater and said first conduit means, space heating means located in a space to be heated and connected in said third conduit means, valve means disposed in said second conduit means for controlling the flow of high temperature heated water therein, second valve means disposed in said third conduit means for controlling the flow of high temperature water therein, pumping means disposed in said first conduit between said heater and the connection with said third conduit means for circulating water in said closed system and in said third conduit means, thermostatic means responsive to the temperature of the water in said tank for operating said heater and pumping means and opening said first valve means to thereby circulate high temperature heated water through said second conduit means to the tank when the temperature of the water in said tank falls below said low temperature, means responsive to the operation of said apparatus for actuating said pumping means and said heater and for opening said first valve means to thereby circulate water through said first system and supply high temperature heated water to said apparatus, second thermostatic means responsive to the temperature of the space to be heated for operating said pumping means and said heater and for opening said second valve means to circulate high temperature heated water through said third conduit means to said space heating means when the temperature in said space falls beneath a set value, and third thermostatic means disposed in the tank and responsive to the temperature of the water therein for preventing flow of high temperature heated water through said second conduit means during periods of operation of said apparatus when the temperature of the water in the tank is raised to a predetermined setting above said low temperature.

7. A water heating device for supplying both a relatively high temperature heated water and a relatively low temperature heated water, comprising a water storage tank to store heated water at said low temperature, a water heater, conduit means connecting said tank and said heater for supplying low temperature heated water to the heater, second conduit means connecting the heater and the tank for returning high temperature heated water to said tank, said tank heater, first conduit means and second conduit means constituting a closed system for the circulation of water, means for introducing cold water to said system, means for withdrawing low temperature heated water from said system, an apparatus adapted to intermittently utilize the high temperature heated water, discharge conduit means connecting said second conduit means and said apparatus for supplying high temperature heated water to said apparatus, a heat exchanger disposed in heat exchanging relation with a fluid to heat the same, third conduit means connecting the heater with the heat exchanger for supplying high temperature heated water to said heat exchanger, fourth conduit means connecting said heat exchanger with said heater for returning water from the heat exchanger to said heater, said heat exchanger, heater, third conduit means and fourth conduit means constituting a second closed circuit for the circulation of water, blower means associated with the heat exchanger for blowing said fluid across said heat exchanger and increasing the rate of heat transfer to said fluid, pumping means for circulating water through each of said systems, valve means connected in said first system for regulating the flow of water therein, second valve means connected in said second system for regulating the flow of water therein, thermostatic means responsive to the temperature of the water in said tank for operating said heater and pumping means and opening said first valve means to thereby circulate water through said first system and supply high temperature heated water to the tank when the temperature of the water in said tank falls below said low temperature, means responsive to the operation of said apparatus for actuating said pumping means and said heater and for opening said first valve means to thereby circulate water through said first system and supply high temperature heated water to said apparatus, and second thermostatic means responsive to the temperature of said fluid for operating said pumping means and said heater and said blower means and for opening said second valve means to thereby circulate water in said second system and supply high temperature heated water to said heat exchanger when the temperature of the fluid falls beneath a predetermined value.

8. A water heating device for supplying both a relatively high temperature heated water and a relatively low temperature heated water, comprising a water storage tank to store heated water at said low temperature, a water heater, conduit means connecting said tank and said heater for supplying low temperature heated water to the heater, second conduit means connecting the heater and the tank for returning high temperature heated water to said tank, said tank heater, first conduit means and second conduit means constituting a closed system for the circulation of water, means for introducing cold water to said system, means for withdrawing low temperature heated water from said system, an apparatus adapted to intermittently utilize the high temperature heated water, discharge conduit means connecting said second conduit means and said apparatus for supplying high temperature heated water to said apparatus and having a length substantially less than the length of said second conduit means, third conduit means connecting said heater and said first conduit means, a space heating unit located in a space to be heated and connected in said third conduit means, said space heating unit including a blower to circulate heated air in said space, valve means disposed in said second conduit means for controlling the flow of high temperature heated water therein, second valve means disposed in said third conduit means for controlling the flow of high temperature water therein, pumping means disposed in said first conduit between said heater and the connection with said third conduit means for circulating water in said first system and in said third conduit means, thermostatic means responsive to the temperature of the water in said tank for operating said heater and pumping means and for opening said first valve means to thereby circulate water through said first system and supply high temperature heated water to said tank when the temperature of the water in said tank falls below said low temperature, means responsive to the operation of said apparatus for actuating said pumping means and said heater and for opening said first valve means to thereby circulate water through said first system and supply high temperature heated water to said apparatus, second thermostatic means responsive to the temperature of the space to be heated for operating said pumping means and said blower and for opening said second valve means to circulate high temperature heated water in said third conduit means when the temperature in said space falls beneath a set value, means for closing said second valve means and preventing flow of high temperature heated water in said third conduit means during periods when high temperature heated water is being drawn through said discharge conduit to said apparatus, and third thermostatic means responsive to the temperature of the water in said third conduit means for preventing operation of said blower if the temperature of the water in said third conduit means is a predetermined amount below said high temperature.

References Cited in the file of this patent

UNITED STATES PATENTS

| | | |
|---|---|---|
| 1,715,040 | Mauck | May 28, 1929 |
| 2,089,176 | Barron | Aug. 10, 1937 |
| 2,210,890 | Bork | Aug. 13, 1940 |
| 2,274,614 | Nessell | Feb. 24, 1942 |
| 2,322,872 | Moore | June 29, 1943 |
| 2,591,400 | Burklin | Apr. 1, 1952 |